(12) United States Patent
Hammerle et al.

(10) Patent No.: US 6,305,160 B1
(45) Date of Patent: Oct. 23, 2001

(54) EMISSION CONTROL SYSTEM

(75) Inventors: Robert Henry Hammerle, Franklin; Karen Marie Adams, Dearborn Heights; Paul Matthew Laing, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/353,295

(22) Filed: Jul. 12, 1999

(51) Int. Cl.[7] ........................................ F01N 3/00
(52) U.S. Cl. .................. 60/274; 60/277; 60/286; 60/295; 60/301
(58) Field of Search ..................... 60/274, 277, 286, 60/301, 295

(56) References Cited

U.S. PATENT DOCUMENTS

| | | |
|---|---|---|
| 4,403,473 | 9/1983 | Gladden . |
| 4,751,054 | 6/1988 | Watanabe . |
| 4,854,123 | 8/1989 | Inoue . |
| 5,201,802 * | 4/1993 | Hirota et al. ............................ 60/276 |
| 5,233,934 | 8/1993 | Krigmont et al. . |
| 5,367,875 * | 11/1994 | Aboujaoude et al. ................ 60/286 |
| 5,369,956 | 12/1994 | Daudel et al. . |
| 5,406,790 * | 4/1995 | Hirota et al. ............................ 60/276 |
| 5,524,432 * | 6/1996 | Hansel ................................... 60/274 |
| 5,540,047 | 7/1996 | Dahlheim et al. . |
| 5,605,042 * | 2/1997 | Stutzenberger ....................... 60/286 |
| 5,709,080 * | 1/1998 | Arora et al. ............................ 60/274 |
| 5,806,310 * | 9/1998 | Daidou et al. ......................... 60/286 |
| 5,809,774 * | 9/1998 | Peter Hoblyn et al. ............... 60/286 |
| 5,845,487 | 12/1998 | Fraenkle et al. . |

* cited by examiner

Primary Examiner—Thomas Denion
Assistant Examiner—Thai Ba Trieu
(74) Attorney, Agent, or Firm—John D. Russell

(57) ABSTRACT

A reductant injection control strategy for controlling an amount of nitrogen oxide reducing agent injected upstream of a selective reduction catalyst uses a NOx sensor located downstream of the catalyst. An open loop injection quantity is first determined based on operation conditions. Nitrogen oxide conversion efficiency of the catalyst is controlled by controlling the reductant injection based on after catalyst NOx sensor reading and engine out nitrogen oxide concentration.

8 Claims, 2 Drawing Sheets

EMISSION CONTROL SYSTEM

FIELD OF THE INVENTION

The invention relates to a system and method for controlling ammonia injection upstream of a selective reduction catalyst for use with an internal combustion engine.

BACKGROUND OF THE INVENTION

In order to meet some emission regulations, selective catalytic reduction systems using externally added reducing agents can be used. In such a system, regulated emissions, such as certain nitrogen oxides, or NOx, can be reduced in a oxygen-rich environment to nitrogen and water over a catalyst when a reducing agent, such as ammonia, is added. In addition to controlling nitrogen oxide emissions, the amount of excess ammonia, or ammonia slip, must be managed. Ammonia slip occurs when ammonia in excess of that used to reduce the nitrogen oxides passes through the catalyst unaffected and exits the catalyst (as ammonia slip).

One method for regulating nitrogen oxide emissions and ammonia slip is to use an after-catalyst NOx sensor to detect nitrogen oxide concentration. Control of NOx emissions are allegedly achieved by varying reductant injection until the level or quantity of nitrogen oxides as measured by the sensor falls within an acceptable limit. The amount of reductant injected to keep NOx emissions within the acceptable limit needs to be balanced with an ammonia slip limit. This can be measured and controlled by an after-catalyst ammonia sensor. Such a system is disclosed in U.S. Pat. No. 5,233,934. Alternatively, ammonia slip can be calculated and controlled using an algorithm. Such a system is disclosed in U.S. Pat. No. 4,751,054.

The inventors herein have recognized a disadvantage with the above systems. The above systems attempt to control nitrogen oxide emission level, while limiting ammonia slip. However, these systems do not consider NOx conversion efficiency. While NOx conversion efficiency and after-catalyst NOx emission levels are related, there is an important distinction in their use for reductant control strategy. In general, as maximum NOx conversion is approached with increasing ammonia addition (i.e., increasing $NH_3/NOx$ mole ratio), ammonia starts to slip. After maximum NOx conversion is attained, ammonia slip increases more rapidly with increasing $NH_3/NOx$. For example, if a NOx emission level is regulated to a specific concentration value, then at high feed gas NOx levels, the demand for NOx reduction can easily result in attaining a NOx conversion where ammonia slip is likely excessive and prone to go out of control.

In other words, because a catalyst experiences widely varying levels of engine NOx, controlling to a specific concentration value results in widely varying, and less than optimum, NOx conversion efficiency. Thus, prior art methods are insufficient.

SUMMARY OF THE INVENTION

An object of the invention claimed herein is to provide a system and method for controlling ammonia injection upstream of a selective reduction catalyst to obtain a desired level of nitrogen oxide conversion efficiency while keeping ammonia slip as low as possible.

The above object is achieved, and disadvantages of prior approaches overcome by the method of controlling a reductant injection upstream of a catalyst coupled to an internal combustion engine, the method comprising the steps of: generating a reductant injection quantity based at least on an engine operating condition; determining a nitrogen oxide conversion efficiency of the catalyst; and adjusting said injection quantity to obtain a predetermined value of said nitrogen oxide conversion efficiency.

By controlling reductant injection based on operating the catalyst at a desired nitrogen oxide conversion efficiency value, low nitrogen oxide emissions are obtained, and ammonia slip is kept low, even when the operating conditions vary widely and rapidly such as those for vehicle driving.

In other words, it is possible to reduce NOx significantly and keep ammonia slip low by regulating NOx conversion efficiency rather than NOx emission level. Controlling NOx conversion efficiency is particularly useful where NOx production and flow rate vary widely and quickly such as for vehicle engines.

An advantage of the present invention is optimum reduction in NOx while keeping ammonia slip low without need for an ammonia sensor or an algorithm estimate to adjust ammonia slip.

Another advantage of the present invention is improved reduction in NOx emissions while keeping ammonia slip low.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT

Figure 1:
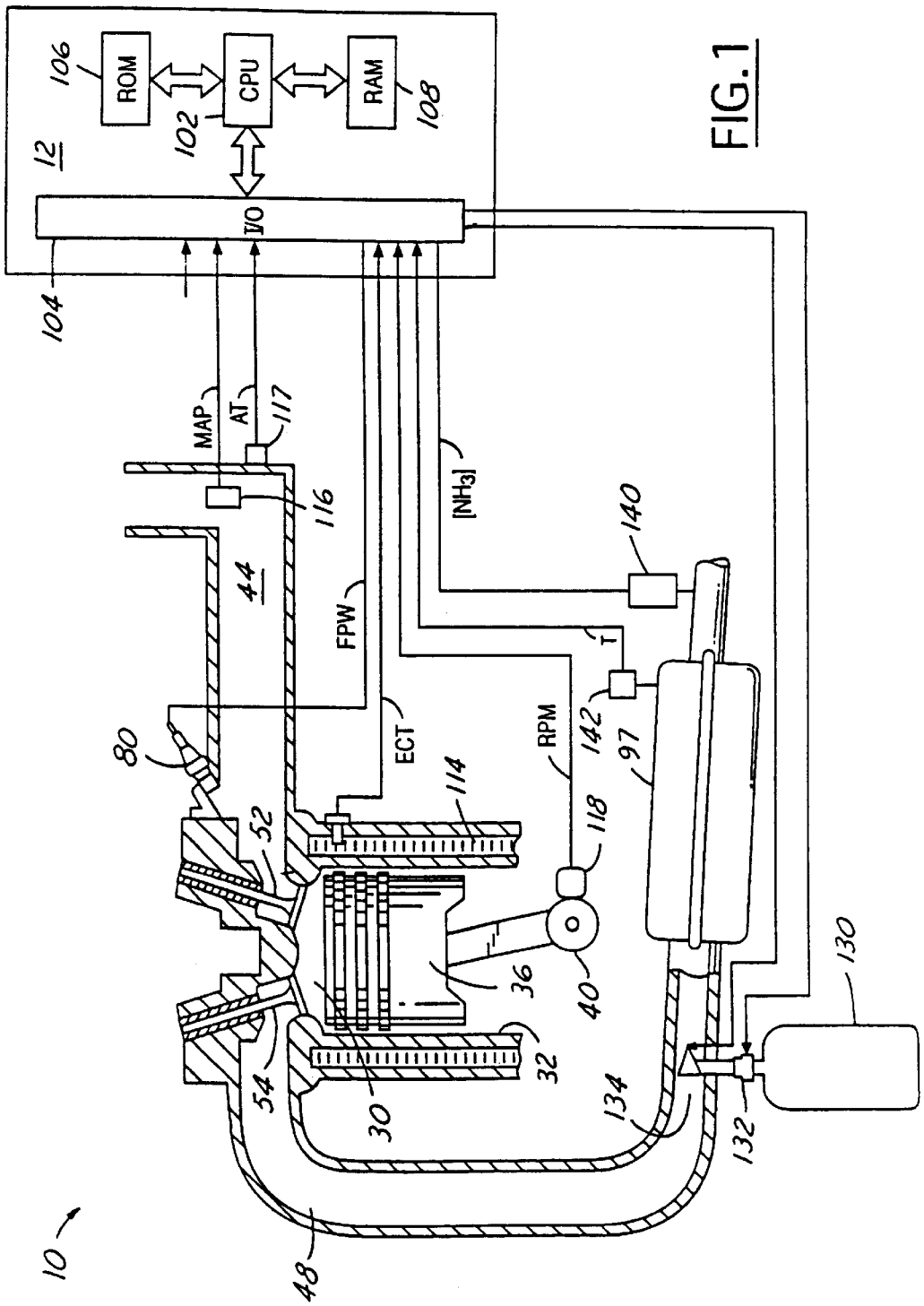
FIG. 1 is a block diagram of an embodiment wherein the invention is used to advantage.

Internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Reducing agent, for example, ammonia, is stored in storage vessel 130 coupled to exhaust manifold 48 upstream of catalyst 97. Control valve 134 controls the quantity of reducing agent delivered to the exhaust gases entering catalyst 97. Pump 132 pressurizes the reducing agent supplied to control valve 134. Both Pump 132 and control valve 134 are controlled by controller 12. NOx sensor 140 is shown coupled to exhaust manifold 48 downstream of catalyst 97. Temperature sensor 142 coupled to catalyst 97 provides an indication of the temperature (T) of catalyst 97. Alternatively, catalyst temperature (T) could be estimated using methods known to those skilled in the art and suggested by this disclosure. NOx sensor 140 provides an indication of nitrogen oxide concentration [$NO_x$] to controller 12 for determining a control signal sent to control valve 134 as described later herein with particular reference to FIGS. 2–3.

Controller 12 is shown in FIG. 1 as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from 10 engine speed sensor 118 coupled to crankshaft 40.

Figure 2:
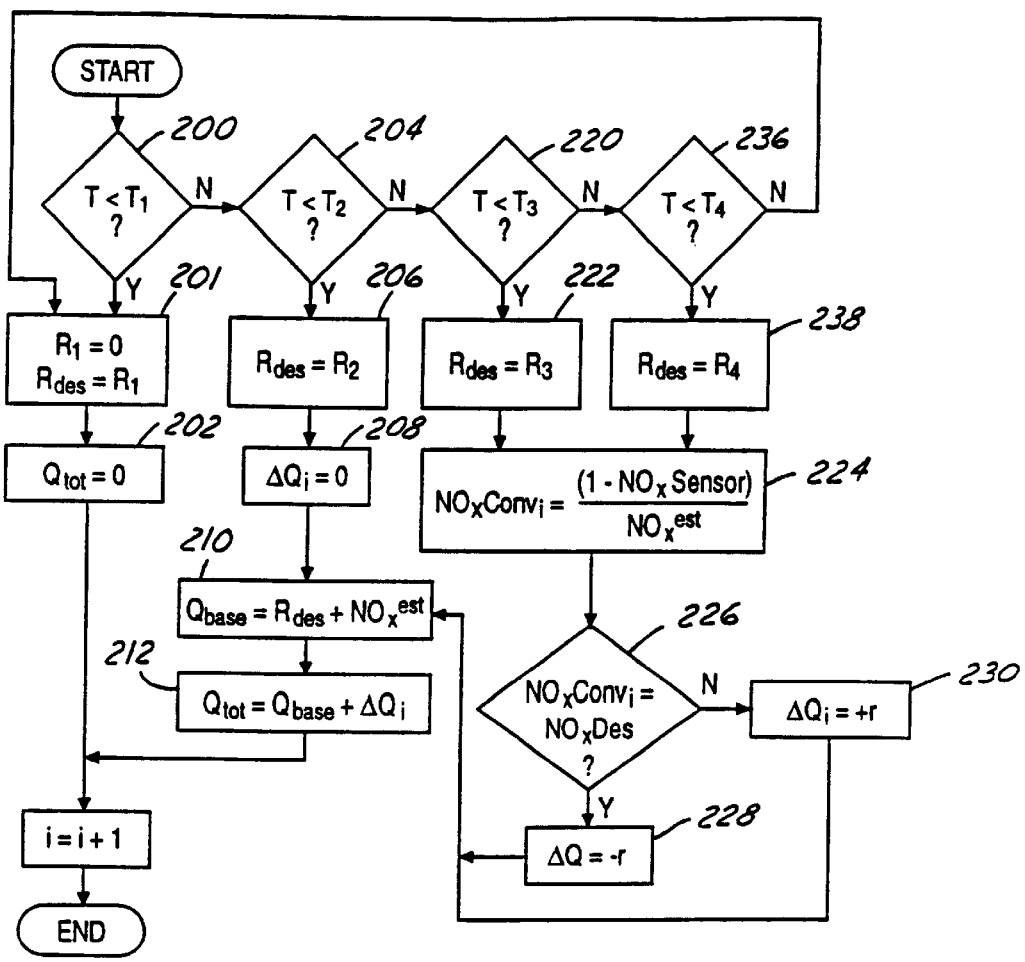
FIGS. 2–3 are high level flow charts of various operations performed by a portion of the embodiment shown in FIG. 1.

Referring now to FIG. 2, a routine for determining a control signal for control valve 134 for controlling reductant addition is described. During step 200, a determination is made as to whether temperature (T) of catalyst 97 is below first threshold temperature T1. Calculation of first threshold temperature T1 is described later herein with particular reference to FIG. 3. When the answer to step 200 is YES, the desired mole ratio (Rdes) is set to zero in step 201 and the total quantity of reductant (Qtot) to be injected by control valve 134 is set to zero in step 202. Thus no reductant is added to the exhaust gases entering catalyst 97 to give a mole ratio (R) equal to first desired Ratio (R1) of zero.

Mole ratio (R) is the ratio of the number of moles of ammonia to the number of moles of nitrogen oxide in engine out exhaust gas. The moles of nitrogen oxide in engine out exhaust gas is calculated based on experimentally determined relationships between nitrogen oxide quantity and engine operating conditions known to those skilled in the art to be indicative of estimated engine out nitrogen oxide quantity ($Nox^{est}$) such as, for example, engine speed, manifold pressure (MAP), intake air temperature (AT), injection timing, injection quantity (FPW), and engine coolant temperature (ECT).

When the answer to step 200 is NO, a determination is made in step 204 as to whether temperature (T) is below second threshold temperature T2. Calculation of second threshold temperature T2 is described later herein with particular reference to FIG. 3. When the answer to step 204 is YES, the desired mole ratio (Rdes) is set to second desired mole ratio (R2) in step 206. Then, adjusted reductant quantity ($DQ_i$) for step i is set to zero in step 208. Then, the base reductant quantity (Qbase) is determined from the product of the desired mole ratio (Rdes) and the estimated engine nitrogen oxide production ($Nox^{est}$) in step 210. Then, in step 212, total desired reductant quantity (Qtot) is determined from the sum of the base reductant quantity (Qbase) and the adjusted reductant quantity ($DQ_i$). The total desired reductant quantity (Qtot) is converted to a control signal sent to control valve 134 for delivering the reductant in proportional thereto.

When the answer to step 204 is NO, a determination is made in step 220 as to whether temperature (T) is below third threshold temperature T3. Calculation of third threshold temperature T3 is described later herein with particular reference to FIG. 3. When the answer in step 220 is YES, the desired mole ratio (Rdes) is set to third desired mole ratio (R3) in step 222.

Figure 3:
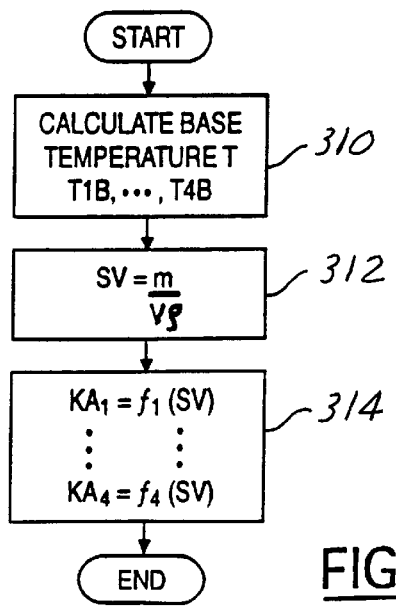

Continuing with FIG. 3, in step 224, the value of the nitrogen oxide conversion efficiency ($NOxConv_i$) at step i is determined from sensor 140 and estimated engine out nitrogen oxide quantity ($Nox^{est}$). In step 226, a determination is made as to whether the nitrogen oxide conversion efficiency at step i is greater than a desired NOx conversion efficiency. The desired NOx conversion efficiency (NOxDES) is determined as a fraction of estimated engine out nitrogen oxide quantity ($Nox^{est}$). In addition, the desired NOx conversion efficiency can be changed versus temperature (T). The optimum desired NOx conversion as a function of engine out NOx and catalyst temperature is determined from engine testing and stored as predetermined values. Thus, according to the present invention, both the base reductant injection quantity and the desired NOx conversion control value are adjusted based on temperature to improve overall NOx conversion and ammonia slip. In an alternative embodiment, the desired NOx conversion efficiency can be calculated based on a base reductant injection quantity. More specifically, the desired NOx conversion efficiency can be calculated based on a predetermined percentage of base reductant injection quantity, where the predetermined percentage is mapped versus engine operating conditions.

Continuing with FIG. 2, if the answer to step 226 is YES, then the adjusted reductant quantity ($DQ_i$) is set to a negative calibration amount (–r) in step 228. Otherwise, in step 230 the adjusted reductant quantity ($DQ_i$) is set to a positive calibration amount (r).

When the answer to step 220 is NO, a determination is made in step 236 as to whether temperature (T) is below fourth threshold temperature T4. Calculation of fourth threshold temperature T4 is described later herein with particular reference to FIG. 3. When the answer in step 236 is YES, the desired mole ratio (Rdes) is set to fourth desired mole ratio (R4) in step 238. Then, the routine continues to step 224 previous described herein.

In this way, open loop reductant control is used to calculated the base reductant quantity (Qbase) from the product of the desired mole ratio (Rdes) and the estimated engine nitrogen oxide quantity ($Nox^{est}$). Also, desired mole ratio is adjusted based on catalyst temperature (T) to account for changes in catalyst efficiency.

Adjustment is made to this open loop value in two temperature ranges to attain desired nitrogen oxide conversion efficiency based on measured nitrogen oxide from sensor 140 and estimated engine nitrogen oxide quantity. Further, desired nitrogen oxide conversion efficiency is determined based on both catalyst temperature and engine out NOx production.

Referring now to FIG. 3, a routine for calculating temperature thresholds is now described. First based temperatures (T1B, . . . , T4B) are determined based on predetermined calibration values in step 310. Then in step 312, the space velocity (SV) of the flow exhaust gas flow entering catalyst 97 is calculated based on the mass flow rate (m), density (r), and catalyst Volume (V). Then, in step 314, adjustment values, (KA1, . . . KA4), are determined based on space velocity (SV) of the flow entering catalyst 97 and calibration functions (f1 . . . f4). In a preferred embodiment, functions f1 . . . f4 act to reduce temperatures as space velocity decreases and increase temperatures as space velocity increases.

Although one example of an embodiment which practices the invention has been described herein, there are numerous other examples which could also be described. For example, the invention may be used to advantage with both lean burning diesel and gasoline engines in which nitrogen oxide emissions are produced. The invention is therefore to be defined only in accordance with the following claims.

We claim:

1. A method for controlling a reductant injection upstream of a catalyst coupled to an internal combustion engine, the method comprising the steps of:

generating a reductant injection quantity based on a nitrogen oxide concentration entering the catalyst;

determining a nitrogen oxide conversion efficiency of the catalyst;

generating a desired NOx conversion efficiency value based on a catalyst temperature and said nitrogen oxide concentration entering the catalyst; and adjusting said injection quantity to obtain said desired NOx conversion efficiency value.

2. The method recited in claim 1 wherein said step of determining said nitrogen oxide conversion efficiency of the catalyst further comprises:

generating a nitrogen oxide concentration exiting the catalyst from a sensor positioned downstream of the catalyst;

generating said nitrogen oxide concentration entering the catalyst based on engine operating conditions using predetermined characteristic maps; and determining said nitrogen oxide conversion efficiency based on unity minus said nitrogen oxide concentration exiting the catalyst divided by said nitrogen oxide concentration entering the catalyst.

3. The method recited in claim 1 further comprising the step of:

determining a temperature of the catalyst;

wherein said reductant injection quantity is further based on said temperature.

4. The method recited in claim 3 wherein said desired NOx conversion efficiency value is based on a percentage of said nitrogen oxide concentration entering the catalyst.

5. The method recited in claim 4 further comprising the steps of:

decreasing said injection quantity when said nitrogen oxide conversion efficiency is greater than said desired NOx conversion efficiency value; and increasing said injection quantity when said nitrogen oxide conversion efficiency is less than said desired NOx conversion efficiency value.

6. An article of manufacture comprising:

a computer storage medium having a computer program encoded therein for controlling a reductant injection upstream of a catalyst coupled to an internal combustion engine, said computer storage medium comprising:

code for generating a reductant injection quantity based on a nitrogen oxide concentration entering the catalyst;

code for determining a nitrogen oxide conversion efficiency of the catalyst;

code for generating a desired NOx conversion efficiency value based on a catalyst temperature and said nitrogen oxide concentration entering the catalyst; and code for adjusting said injection quantity to obtain said desired NOx conversion efficiency value.

7. The article recited in claim 6 wherein said medium further comprises:

code for generating a nitrogen oxide concentration exiting the catalyst from a sensor positioned downstream of the catalyst;

code for generating said nitrogen oxide concentration entering the catalyst based on engine operating conditions using predetermined characteristic maps;

code for determining said nitrogen oxide conversion efficiency based on unity minus said nitrogen oxide concentration exiting the catalyst divided by said nitrogen oxide concentration entering the catalyst; and code for determining a temperature of the catalyst;

wherein said reductant injection quantity is further based on said temperature.

8. The article recited in claim 7 wherein said desired NOx conversion efficiency value is based on a percentage of said nitrogen oxide concentration entering the catalyst.

* * * * *